(12) United States Patent
Grasser et al.

(10) Patent No.: US 10,379,367 B2
(45) Date of Patent: Aug. 13, 2019

(54) OPTICAL DEVICE FOR ADJUSTING THE SPATIAL DISTRIBUTION OF A LASER BEAM

(71) Applicant: Compagnie Industrielle des Lasers CILAS, Orleans (FR)

(72) Inventors: Regis Grasser, Olivet (FR); Sandrine Cussat-Blanc, Vienne en Val (FR)

(73) Assignee: Compagnie Industrielle des Lasers CILAS, Orleans (FR)

( * ) Notice: Subject to any disclaimer, the term of this patent is extended or adjusted under 35 U.S.C. 154(b) by 303 days.

(21) Appl. No.: 14/276,520

(22) Filed: May 13, 2014

(65) Prior Publication Data

US 2014/0340471 A1 Nov. 20, 2014

(30) Foreign Application Priority Data

May 14, 2013 (FR) ..................................... 13 01101

(51) Int. Cl.
*G02B 27/09* (2006.01)
*G02B 3/00* (2006.01)
*G02B 19/00* (2006.01)

(52) U.S. Cl.
CPC ....... *G02B 27/0961* (2013.01); *G02B 3/0062* (2013.01); *G02B 19/0014* (2013.01); *G02B 19/0052* (2013.01); *G02B 27/0927* (2013.01)

(58) Field of Classification Search
CPC ............ G02B 27/0927; G02B 27/0961; G02B 3/0062
USPC ......................................................... 348/36
See application file for complete search history.

(56) References Cited

U.S. PATENT DOCUMENTS

| 3,522,424 A * | 8/1970 | Fritsch ................... F21S 8/003 359/619 |
| 6,552,760 B1 | 4/2003 | Gotoh et al. |
| 2003/0063390 A1* | 4/2003 | Brown ................. G02B 3/0043 359/619 |
| 2007/0058246 A1* | 3/2007 | Westphal ............. G02B 21/082 359/368 |
| 2012/0013877 A1* | 1/2012 | Tanaka ................. G02B 26/008 355/67 |
| 2012/0249621 A1 | 10/2012 | Miura |
| 2012/0249973 A1* | 10/2012 | Miura ................ G02B 27/0905 353/38 |
| 2012/0294037 A1* | 11/2012 | Holman .................... F21V 5/02 362/609 |

FOREIGN PATENT DOCUMENTS

WO  95/00865 A1  1/1995

OTHER PUBLICATIONS

French Preliminary Search Report of Application No. 1301101 dated Feb. 17, 2014.

* cited by examiner

*Primary Examiner* — Mehrdad Dastouri
*Assistant Examiner* — Kristin Dobbs
(74) *Attorney, Agent, or Firm* — Sughrue Mion, PLLC

(57) ABSTRACT

Optical device for adjusting the spatial distribution of a laser beam.
The device (1) comprises an assembly (2) of two matrices (3, 4) of lenses (5a), said matrices (3, 4) being identical and arranged parallel to one another with a uniform spacing between them, said assembly (2) being traversable by a laser beam (6), and controllable activating means (10) capable of modifying the spacing between the two matrices (3, 4) to create a zoom effect.

10 Claims, 3 Drawing Sheets

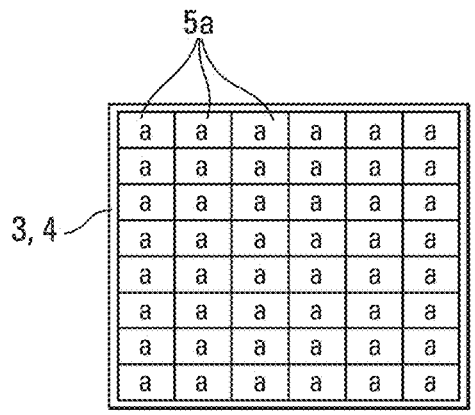
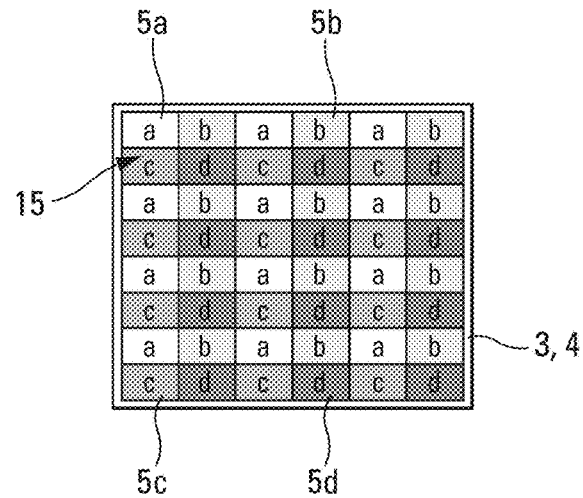
Fig. 3A          Fig. 3B
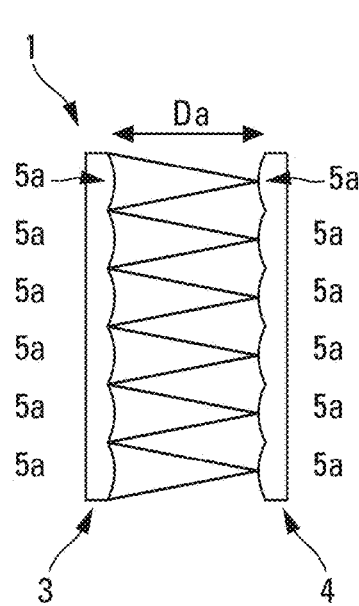
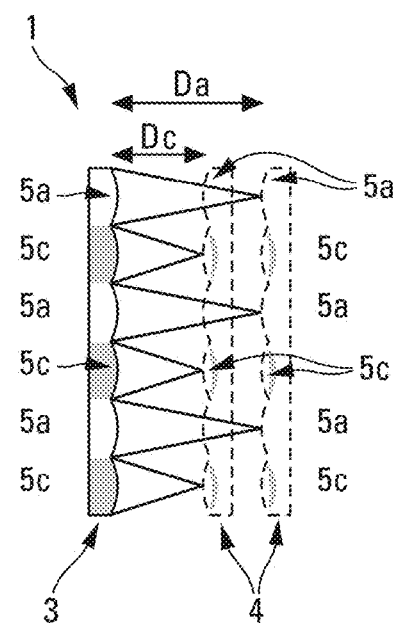
Fig. 4A          Fig. 4B

OPTICAL DEVICE FOR ADJUSTING THE SPATIAL DISTRIBUTION OF A LASER BEAM

The present invention relates to an optical device for adjusting the spatial distribution of a laser beam.

It also relates to an active observation system comprising such an optical device, in particular for defence and security applications.

Usually an active observation system comprises a receiver camera for capturing images of a scene to be observed. An active observation system of this kind also uses laser illumination for increasing the quality of the image in order to obtain better identification or highlight a specific target in the field of vision.

The laser source for delivering the laser illumination generally comprises a means for adjusting the shape of the laser beam to adapt the field of vision observed to the receiving channel of the camera.

The purpose of this means for adjusting the shape of the laser beam is to transform the shape of the spatial distribution of the laser source into a shape that is generally close to a uniform rectangle.

Furthermore, in such an active observation system the optical illumination system must have the ability to zoom (or enlarge) and be adjustable to change the size of the illuminated field of vision.

The usual approach is to separate the shape adjusting function (into a uniform rectangle) and the zoom function.

Generally, the shaping of the beam is performed by means of a light channel or a matrix of lenses as indicated below, and the zoom function is controlled through a magnifying optical device with variable focal length.

The usual way of adjusting the beam and producing uniform illumination in the far field from any laser beam is to use an assembly of two identical elements with matrices of lenses facing one another. When light passes through this assembly the near field distribution remains the same and the far field distribution is homogenised. Compared to the light channel homogenisation technique, the volume required for this solution based on matrices of lenses is smaller.

Despite these features the usual solution providing for different means for performing the two aforementioned functions (shape adjustment and zoom) has disadvantages particularly in terms of complexity, size, volume and cost.

The present invention relates to an optical device for adjusting the spatial distribution of a laser beam that makes it possible to overcome these disadvantages.

For this purpose, according to the invention said optical device of the type comprising an assembly of two matrices of lenses, with said matrices being identical and arranged parallel to one another with uniform spacing between them, and said assembly being traversable by the laser beam, is remarkable in that it also comprises controllable activating means capable of modifying the spacing between the two matrices to create a zoom (or enlargement) effect.

Furthermore, said device advantageously comprises interface means enabling an operator to control said activating means.

Thus, according to the invention, the assembly of matrices (which is capable of adjusting the shape of the beam in the usual manner) is acted upon so that it also generates a zoom effect.

For this the spacing between the two matrices is modified relative to a nominal spacing.

Consequently, the two functions (shape adjustment and zoom) are performed by one and the same assembly (instead of two different means). This makes it possible to reduce the space required and the mass and provide a simpler illumination solution at a reduced cost.

Although it is conceivable to displace both matrices, in a particular simplified embodiment said activating means are configured to displace only one of the matrices relative to the other with the aim of modifying the spacing.

Furthermore, in a preferred embodiment, to increase the size of the zoom effect, each of the two matrices of said assembly comprises at least two different types of lens, having different focal distances.

As different types of lens have slightly different focal distances the nominal spacing is therefore different from one type of lens to the other. As each of the nominal spacings makes it possible for the associated lens type to generate a corresponding zoom effect, by modifying the spacing of all of the nominal distances the size of the zoom effect of said adjusting device is increased.

In a first variant of this preferred embodiment, each of the two matrices comprises at least one group of at least two different types of lens, and said group of different types of lens is arranged in a pattern that is reproduced a plurality of times on each of said matrices. Preferably, said pattern is reproduced uniformly on said matrices.

In a second variant of this preferred embodiment, each of the two matrices of said assembly comprises, for each different type of lens, at least one assembly of identical adjacent lenses, and said assemblies (forming for example a row or a column, or even a geometric figure such as a square or a rectangle) are reproduced a plurality of times, preferably uniformly, on each of said matrices.

The present invention also relates to a laser illumination unit comprising at least one laser source and a device for adjusting the spatial distribution, as mentioned above.

The present invention also relates to an active observation system of the type comprising at least:
  a laser source that is capable of emitting at least one laser pulse;
  a camera capable of capturing the image of a field of vision illuminated by said laser source; and
  a control unit that simultaneously controls said laser source and said camera.

According to the invention, this active observation system is remarkable in that it also comprises at least one device for adjusting the spatial distribution, as mentioned above.

The present invention also relates to a method for adjusting the spatial distribution of a laser beam, according to which method an assembly of two matrices of lenses is provided, said matrices being identical and arranged parallel to one another with uniform spacing between them, said assembly being traversable by the laser beam. According to the invention the spacing between the two matrices is modified to create a zoom effect by means of said assembly of matrices.

Furthermore, each of the two matrices of said assembly advantageously comprises at least one group of at least two different types of lens, having different focal distances, and said group of different types of lens is arranged according to a pattern that is reproduced a plurality of times on each of said matrices.

The figures of the attached drawing illustrate how the invention can be embodied. In the figures, the same reference numbers denote similar elements.

FIGS. 3A and 4A show a simplified embodiment of a device according to the invention.

FIGS. 3B and 4B show a preferred embodiment of a device according to the invention having an increased zoom size.

Figure 1:
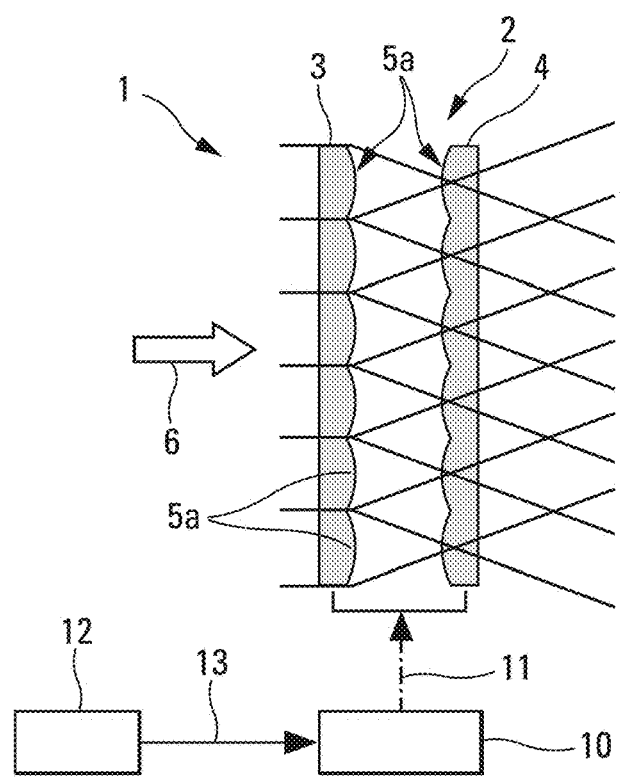
FIG. 1 illustrates very schematically a device according to the invention.

The optical device 1 according to the invention and shown schematically in FIG. 1 is suitable for adjusting the spatial distribution, in terms of shape and size, of a laser beam.

Said optical device 1 comprises, in the usual manner, an assembly 2 of two matrices 3 and 4 of lenses 5a facing one another, for adjusting the shape of the spatial distribution of the laser beam 6 capable of traversing said assembly 2. These two matrices 3 and 4 are identical and are arranged parallel to one another, therefore having uniform spacing between them.

Figure 2A:
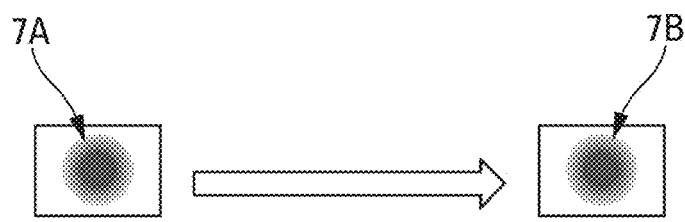
FIGS. 2A and 2B show schematically the shape of the spatial distribution of a laser beam generated by a device according to the invention, in a near field and in a far field respectively.
Figure 2B:
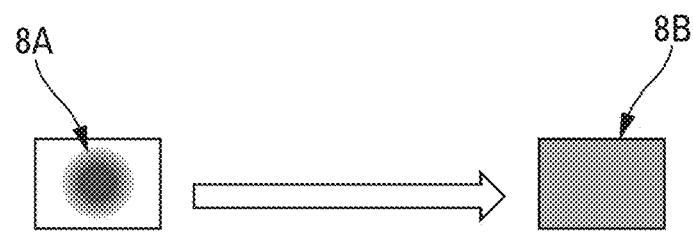

This assembly 2 for adjusting the spatial shape of the beam makes it possible to transform the spatial distribution of the laser source into a shape generally close to a uniform rectangle, for an appropriate spacing between the matrices 3 and 4 referred to as the nominal spacing. When light traverses this assembly 2:
  the near field distribution remains the same, as shown in FIG. 2A, with 7A and 7B being the distributions upstream and downstream of the assembly 2; and
  the far field distribution is homogenised (as shown in FIG. 2B, with 8A and 8B being the distributions upstream and downstream of the assembly 2) into a shape close to a uniform rectangle, adapted to the field of vision of an optical element, in particular a camera. The size of the matrices 3 and 4 (which are identical) depends on the features of the laser beam 6. However, by way of example, the dimensions can be in the order of one inch (about 2.5 centimeters) in height and width, and less than 10 mm in length.

According to the invention, said optical device 1 for adjusting the spatial distribution also comprises activating means 10, for example of the piezo-electric type, which can be controlled and which are capable of modifying the spacing between the two matrices 3 and 4 whilst keeping them parallel, as illustrated schematically by a dash-dotted arrow 11 in FIG. 1.

Although acting on the displacement of the two matrices 3 and 4 can be envisaged, in a particular simplified embodiment said activating means 10 are configured to displace only one of the said matrices relative to the other for the purpose of modifying the spacing.

Furthermore, said device 1 also comprises a man/machine interface unit 12 enabling an operator to control said activating means 10 via a link 13.

The present invention therefore makes it possible to change the spacing between the two matrices 3 and 4 relative to a nominal spacing Da.

In a simplified embodiment shown in FIGS. 3A and 4A, all of the lenses 5a (indicated by "a" in FIG. 3A to simplify the drawing) of each of the matrices 3 and 4 are identical. When the assembly 2 is placed in an optical array, the nominal distance Da must be respected to obtain the zoom function.

However, with matrices 3 and 4 comprising identical lenses 5a, said zoom technique remains limited. In fact, beyond 25% on either side of the nominal spacing Da (corresponding approximately to a zoom effect of "×0.8" to "×1.1"), the quality and effectiveness of the illumination are reduced.

Furthermore, in a preferred embodiment, to increase the size of the zoom effect, each of the two matrices 3 and 4 comprises at least two different types of lens, having slightly different focal distances.

In the example of FIGS. 3B and 4B (as well as FIGS. 5 and 6) relating to this preferred embodiment, each matrix 3, 4 comprises four different types 5a, 5b, 5c and 5d of lens.

In the example of FIGS. 3B and 4B, an assembly of four different types of adjacent lens 5a, 5b, 5c and 5d forms a pattern 15 that is reproduced a plurality of times on each of the matrices 3 and 4.

As shown in FIG. 3B, the pattern 15 of the four lenses 5a, 5b, 5c, 5d (indicated by the letters "a", "b", "c" and "d" in this FIG. 3B to simplify the drawing) is therefore reproduced in a uniform manner, in rows and columns, on said matrices 3 and 4. The same patterns 15 of the two matrices 3 and 4 face one another.

As the different types of lens 5a, 5b, 5c and 5d have slightly different focal distances, the nominal spacing differs from one type of lens to the other. Consequently, when the assembly 2 is placed in the optical array, a series of nominal spacings can be obtained.

FIG. 4B illustrates two nominal spacings Da and Dc corresponding respectively to the two types of lens 5a and 5c.

For this preferred embodiment of FIG. 3B, there is no global nominal spacing for all of the types of lens 5a to 5d. The quality of the homogenisation is thus slightly reduced in relation to the simplified architecture of FIG. 3A. However, the reduction in performance remains small and is constant over a wide spacing range. This preferred embodiment makes it possible to obtain an optical zoom effect of "×3".

In a variant of this preferred embodiment, each of the two matrices 3, 4 comprises, for each of the different types of lens 5a, 5b, 5c, 5d (indicated by the letters "a", "b", "c" and "d" in FIGS. 5 and 6 to simplify the drawing), an assembly of identical adjacent lenses. By way of illustration, in the example of FIG. 5, the types of lens 5a to 5d form assemblies 16A to 16D respectively, and in the example of FIG. 6 the types of lens 5a to 5d form assemblies 17A to 17D respectively. Said assemblies (forming for example a row or a column, or even a geometric figure such as a square or a rectangle) are reproduced a plurality of times, preferably in a uniform manner, on each of said matrices 3, 4. In particular:
  in the example of FIG. 5, each of said assemblies 16A to 16D has a rectangular shape, a different shape also being possible; and
  in the example of FIG. 6, each of said assemblies 17A to 17D represents a row of the matrix 3, 4. It could also be a column of the matrix 3, 4.

Figure 5:
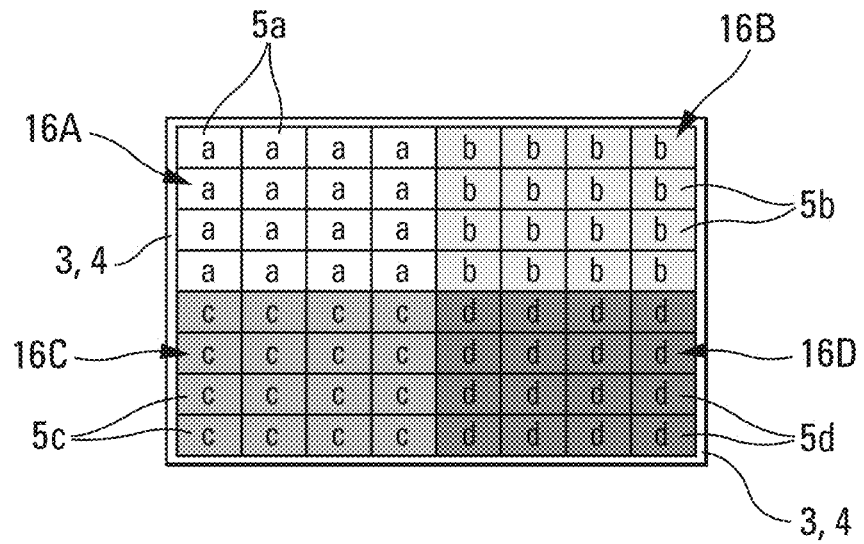
FIGS. 5 and 6 illustrate variants of the preferred embodiment having an increased zoom size.
Figure 6:
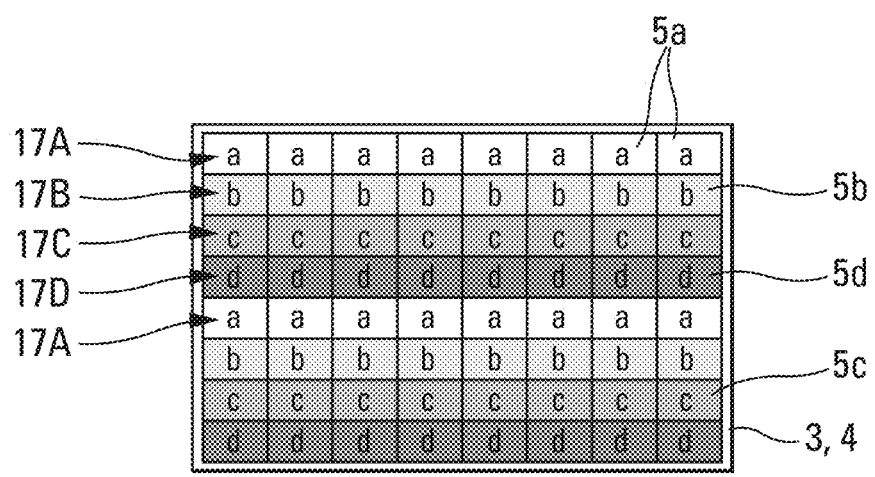

Of course, the patterns 15 and the assemblies 16A to 16D and 17A to 17D are reproduced a large number of times on the matrices 3 and 4, although the number of reproductions is reduced in FIGS. 3B, 5 and 6 to simplify the drawing.

Consequently, by means of the invention there is a reduction in the complexity, size and volume of the means for performing the two functions (shape adjustment and zoom). The device 1 according to the invention, intended for this purpose, is smaller, lighter and less expensive than a system using a conventional optical zoom device.

The device 1 according to the invention as described above can form part of a laser illumination unit (not shown) comprising at least one laser source.

Said device 1 can also form part of an active observation system (also not shown), in particular an active observation system of the type comprising:
- at least one laser source that is able to emit at least one laser pulse (to illuminate a scene of the environment), and with which said device 1 is associated;
- a camera capable of capturing the image of a scene illuminated by said laser source, for example through said shutter. In this case, said camera can comprise a controllable shutter capable of being moved alternately into an open position, in which it allows the said laser pulse to pass, and a closed position, in which it prevents the passage of said laser pulse; and
- a control unit that simultaneously controls said laser source and said camera, and if applicable said shutter.

The invention claimed is:

1. An optical device for adjusting the far field spatial distribution of a laser beam, said device comprising:
   an assembly of two matrices of lenses, said two matrices being identical and arranged parallel to one another, said assembly being traversable by the laser beam, wherein corresponding lenses of said two matrices have respective nominal spacings such that said assembly makes it possible to transform the spatial distribution of the laser beam to uniformly illuminate a shape close to a uniform rectangle in the far field and such that the near field distribution remains the same as the distribution of the laser source; and
   controllable activating means configured to modify spacing, relative to the respective nominal spacings, between the two matrices whilst keeping the two matrices parallel to create a zoom effect based on the respective nominal spacings,
   wherein a pattern formed by a set of the lenses is reproduced in a uniform manner in rows and column on each of said two matrices, and the same patterns of the two matrices oppose one another whilst keeping the two matrices parallel, and
   wherein the pattern comprises at least two different types of lenses having different focal distances for the controllable activating means to adjust the zoom effect.

2. The device according to claim 1, further comprising interface means enabling an operator to control said activating means.

3. The device according to claim 1, wherein said activating means is configured to displace only one of said two matrices in relation to another of said two matrices in order to modify the spacing between the two matrices.

4. The device according to claim 1, wherein that the pattern is reproduced a plurality of times on each of said two matrices.

5. The device according to claim 1, wherein each of the two matrices comprises, for each of the different types of lens, at least one assembly of identical adjacent lenses and said assemblies are reproduced a plurality of times on each of said two matrices.

6. A laser illumination unit comprising at least one laser source, further comprising an optical device for adjusting the spatial distribution, as specified in claim 1.

7. An active observation system of the type comprising at least:
   a laser source configured to emit at least one laser pulse;
   a camera configured to capture the image of a field of vision illuminated by said laser source;
   a control unit that simultaneously controls said laser source and said camera; and
   an optical device for adjusting the spatial distribution, as specified in claim 1.

8. A method for adjusting the far field spatial distribution of a laser beam, comprising the following steps:
   providing an assembly of two matrices of lenses, said two matrices being identical and arranged parallel to one another, wherein corresponding lenses of said two matrices have respective nominal spacings such that said assembly makes it possible to transform the spatial distribution of the laser beam to uniformly illuminate a shape close to a uniform rectangle in the far field and such that the near field distribution remains the same as the distribution of the laser source, said assembly being traversable by the laser beam; and
   modifying spacing, relative to the respective nominal spacings, between the two matrices whilst keeping the two matrices parallel to create a zoom effect based on the respective nominal spacings by means of said assembly of two matrices,
   wherein a pattern formed by a set of the lenses is reproduced in a uniform manner in rows and column on each of said two matrices, and the same patterns of the two matrices opposes one another whilst keeping the two matrices parallel, and
   wherein the pattern comprises at least two different types of lenses having different focal distances for the controllable activating means to adjust the zoom effect.

9. The device according to claim 1, wherein the respective nominal spacings are dependent on the different focal distances of the lenses.

10. The device according to claim 5, wherein each of said assemblies has a rectangular shape of a row of the two matrices or a column of the two matrices.

* * * * *